United States Patent US 11,041,449 B2
Guiduzzi et al.    (45) Date of Patent:    Jun. 22, 2021

(54) THROTTLE VALVE WITH THE POSSIBILITY OF ADJUSTING AN INTERMEDIATE POSITION OF PARTIAL OPENING AND RELATIVE METHOD TO ADJUST THE INTERMEDIATE POSITION

(71) Applicant: MARELLI EUROPE S.p.A., Corbetta (IT)

(72) Inventors: Lorenzo Guiduzzi, Bologna (IT); Stefano Musolesi, San Giovanni In Persiceto (IT); Federico Caroti, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/295,289

(22) Filed: Mar. 7, 2019

(65) Prior Publication Data
US 2019/0277202 A1    Sep. 12, 2019

(30) Foreign Application Priority Data
Mar. 7, 2018    (IT) .......................... 102018000003347

(51) Int. Cl.
*F02D 9/10*    (2006.01)
*F16K 31/53*    (2006.01)
(Continued)

(52) U.S. Cl.
CPC ........... *F02D 9/1065* (2013.01); *F02D 9/107* (2013.01); *F16K 1/221* (2013.01); *F16K 31/041* (2013.01);
(Continued)

(58) Field of Classification Search
CPC ...... F02D 9/1065; F02D 9/107; F02D 11/107; F02D 9/02; F02D 9/105;
(Continued)

(56) References Cited

U.S. PATENT DOCUMENTS 3,535,948 A * 10/1970 Rychlik ................. F16H 55/22
   74/440
5,271,287 A * 12/1993 Wadleigh ............... B23K 20/12
   474/152
(Continued)

FOREIGN PATENT DOCUMENTS

DE    10202096 A1    7/2003
EP    1099839 A2    5/2001
(Continued)

OTHER PUBLICATIONS

Search Report for Italian Patent Application No. 201800003347 dated Nov. 21, 2018.

*Primary Examiner* — Mahmoud Gimie
*Assistant Examiner* — Joshua Campbell
(74) *Attorney, Agent, or Firm* — Howard & Howard Attorneys PLLC

(57) ABSTRACT

A throttle valve having: a valve body; an intake duct obtained in the valve body; a throttle plate arranged in the intake duct; a shaft mounted so as to rotate, supporting the throttle plate; an electric motor; a gear transmission, which couples the electric motor to the shaft and has an end gear which is integral with the shaft; a return spring, which is designed to rotate the throttle plate towards a closing position; a striking element, which is obtained in the valve body and establishes an intermediate position of partial opening; and a countering spring, mounted on the end gear, which is designed to rotate the throttle plate towards the intermediate position and has one end which is designed to rest against the striking element during the rotation of the end gear.

12 Claims, 11 Drawing Sheets

(51) Int. Cl.
  *F16K 1/22* (2006.01)
  *F16K 31/04* (2006.01)
  *F02B 3/06* (2006.01)
  *F02D 9/02* (2006.01)
  *F02D 11/10* (2006.01)

(52) U.S. Cl.
  CPC .............. *F16K 31/535* (2013.01); *F02B 3/06* (2013.01); *F02D 9/105* (2013.01); *F02D 11/107* (2013.01); *F02D 2009/0269* (2013.01); *F02D 2009/0277* (2013.01)

(58) Field of Classification Search
  CPC ..... F02D 2009/0269; F02D 2009/0277; F16K 31/041; F16K 31/221
  USPC ......................................................... 123/399
  See application file for complete search history.

(56) References Cited

U.S. PATENT DOCUMENTS

| | | | | |
|---|---|---|---|---|
| 6,364,287 | B1* | 4/2002 | Rauch | F02D 9/1065 137/315.22 |
| 2002/0104981 | A1* | 8/2002 | Gnage | B29C 66/322 251/305 |
| 2002/0124817 | A1* | 9/2002 | Abei | F02B 63/02 123/73 C |
| 2003/0005910 | A1* | 1/2003 | Komeda | F02D 11/10 123/399 |
| 2003/0145827 | A1* | 8/2003 | Klug | F02D 11/107 123/396 |
| 2004/0173184 | A1* | 9/2004 | Tanimura | F02D 11/10 123/399 |
| 2006/0231072 | A1 | 10/2006 | Saito et al. | |
| 2007/0006846 | A1* | 1/2007 | Wendel | F02D 9/1065 123/399 |
| 2007/0017473 | A1* | 1/2007 | Kondo | F02D 9/1095 123/184.53 |
| 2012/0001105 | A1* | 1/2012 | Hayashi | F16K 31/047 251/78 |
| 2013/0284147 | A1 | 10/2013 | Nicholas | |
| 2015/0337743 | A1* | 11/2015 | Cowan | F02D 11/10 261/64.2 |

FOREIGN PATENT DOCUMENTS

| | | |
|---|---|---|
| EP | 1515023 A1 | 3/2005 |
| WO | 2016170292 A1 | 10/2016 |

\* cited by examiner

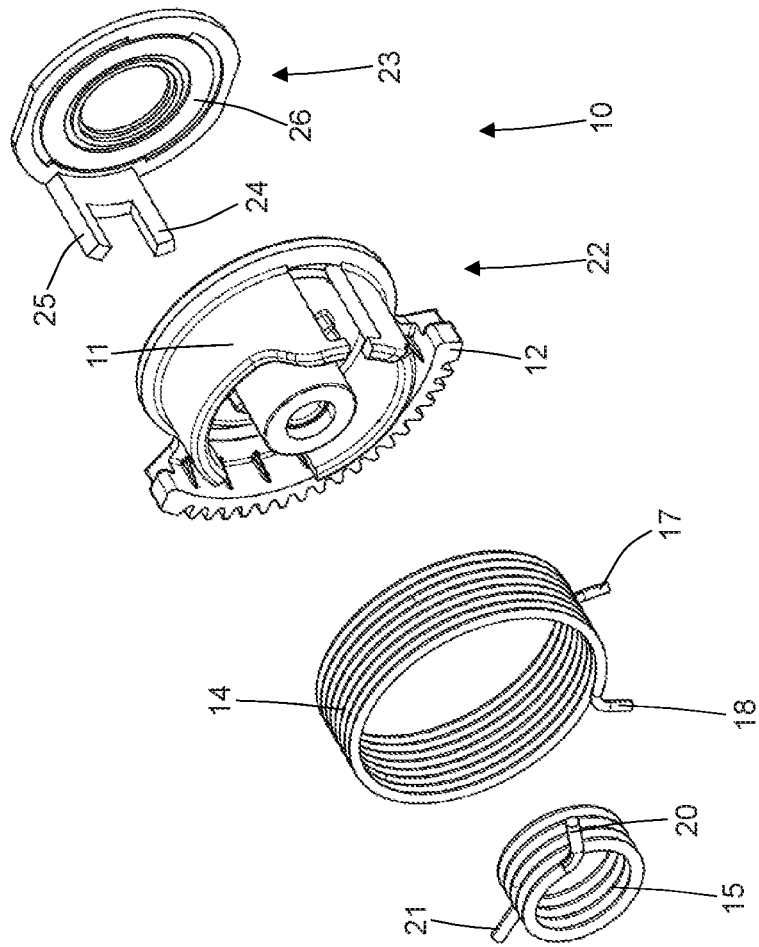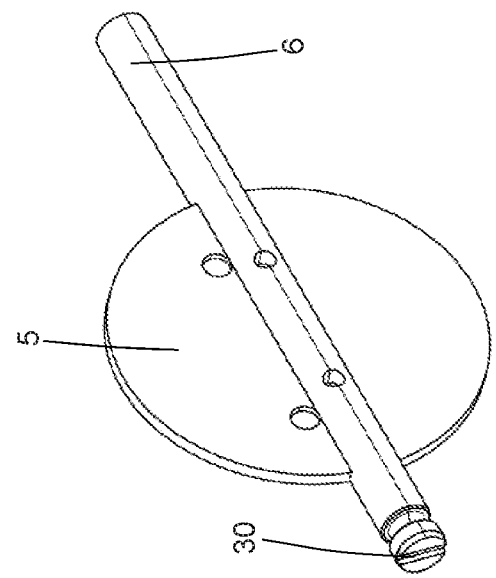
Fig. 6

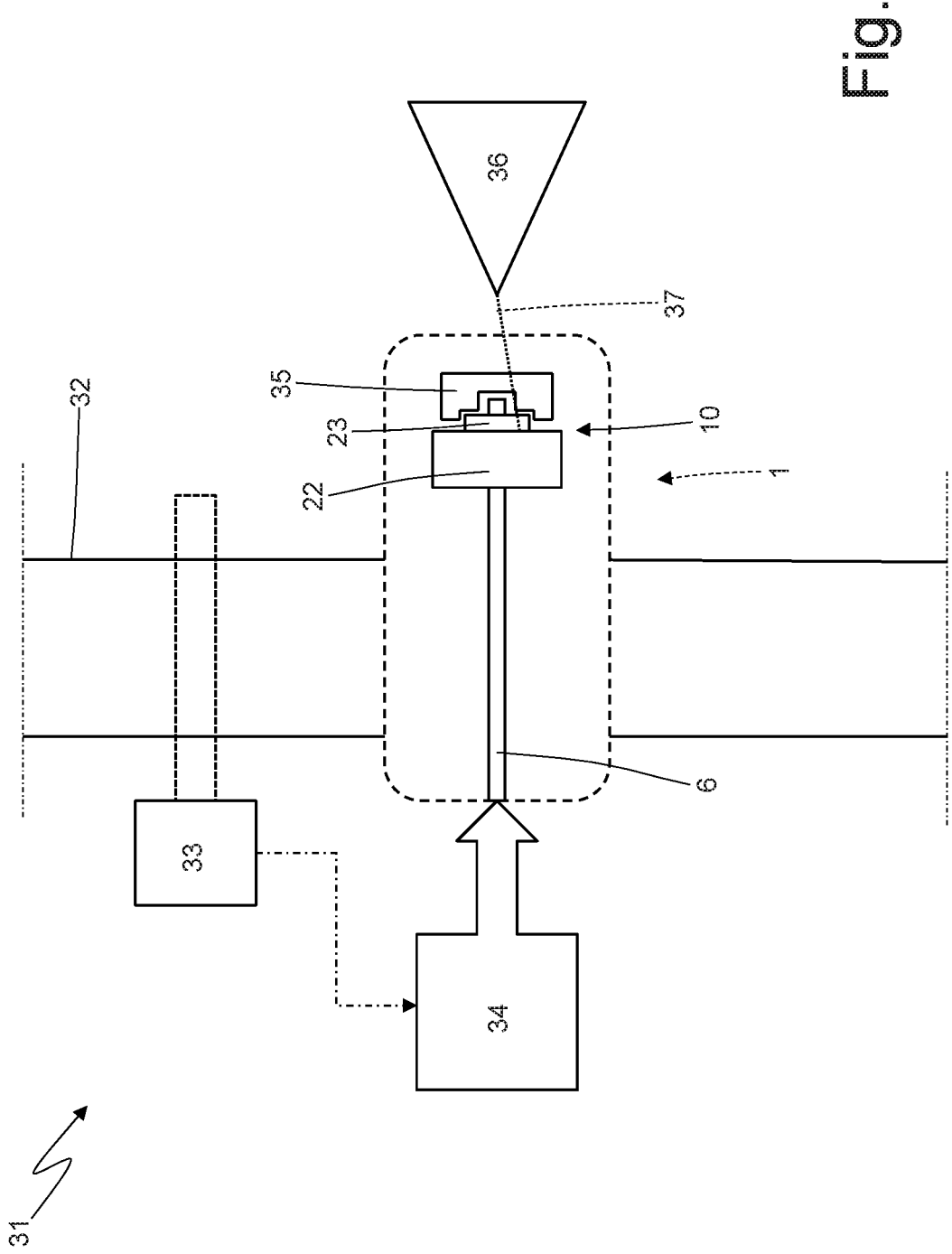

THROTTLE VALVE WITH THE POSSIBILITY OF ADJUSTING AN INTERMEDIATE POSITION OF PARTIAL OPENING AND RELATIVE METHOD TO ADJUST THE INTERMEDIATE POSITION

CROSS-REFERENCE TO RELATED APPLICATIONS

This patent application claims priority from Italian patent application no. 102018000003347 filed on Mar. 7, 2018, the entire disclosure of which is incorporated herein by reference.

TECHNICAL FIELD

The present invention relates to a throttle valve and relative method to adjust an intermediate position of partial opening.

The present invention can advantageously be applied to a suction throttle valve for an internal combustion engine with the possibility of adjusting the limp-home position (corresponding to an intermediate position of partial opening between a limit position of complete closing and a limit position of complete opening).

PRIOR ART

A throttle valve is normally comprised, in internal combustion engines supplied by petrol, which regulates the air flow rate supplied to the cylinders; typically, the throttle valve has a valve body housing a valve seat engaged by a throttle plate, which is fitted onto a shaft to rotate between an opening position and a closing position due to the action of an electric motor coupled to the shaft by means of a gear transmission. A position sensor is associated with the shaft supporting the throttle valve, which is designed to detect the angular position of the shaft, and thus of the throttle valve, to enable a control unit to control the electric motor in feedback, which determines the position of the throttle valve.

Normally, the throttle valve comprises a spiral return spring, which is mounted coaxial to the shaft and it is mechanically coupled to the shaft to exert a torque on the shaft, which tends to bring the shaft from a position of maximum opening towards an intermediate position of partial opening (also called limp-home position). Furthermore, the throttle valve comprises a spiral countering spring, which is mounted coaxial to the shaft and it is mechanically coupled to the shaft to exert a torque on the shaft, which tends to bring the shaft from a position of complete closing towards the limp-home position; the limp-home position is defined by a striking body, which defines an end stop for the countering spring. The torque generated by the countering spring is greater than the torque generated by the return spring; for this reason, when the electric motor is deactivated, the shaft is arranged in the limp-home position and the electric motor must then generate an engine torque both to bring the shaft into the position of maximum opening and to bring the shaft into the position of complete closing.

Patent applications US2006231072A1, EP1099839A2 and DE10202096A1 describe throttle valves provided with a spiral return spring, which is mounted coaxial to the shaft and it is mechanically coupled to the shaft to exert a torque on the shaft, which tends to bring the shaft from a position of maximum opening towards the limp-home position.

The effective limp-home position (and thus the effective limp-home air flow rate, which crosses the throttle valve in the limp-home position) is subject to various structural tolerances, which make the effective limp-home position generally relatively uncertain (overall the tolerance can reach ±20-25%); in other words, the structural tolerance on the limp-home position (limp-home air flow rate) is relatively great.

DESCRIPTION OF THE INVENTION

It is an object of the present invention to provide a throttle valve and relative method for adjusting an intermediate position of partial opening, which throttle valve and adjustment method enable a highly precise air flow rate to be obtained when the throttle valve is in the intermediate position and which are also easy and cheap to make.

According to the present invention a throttle valve and relative method for adjusting an intermediate position of partial opening are provided, in accordance with the accompanying claims.

BRIEF DESCRIPTION OF THE DRAWINGS

The present invention will now be described with reference to the appended drawings, which illustrate a non-limiting embodiment thereof, wherein:

FIGS. 5 and 6 are two different exploded perspective views of the movable apparatus in FIG. 4;

FIG. 11 is a schematic view of a station for calibrating the limp-home position of the throttle valve in FIG. 1.

PREFERRED EMBODIMENTS OF THE INVENTION

Figure 1:
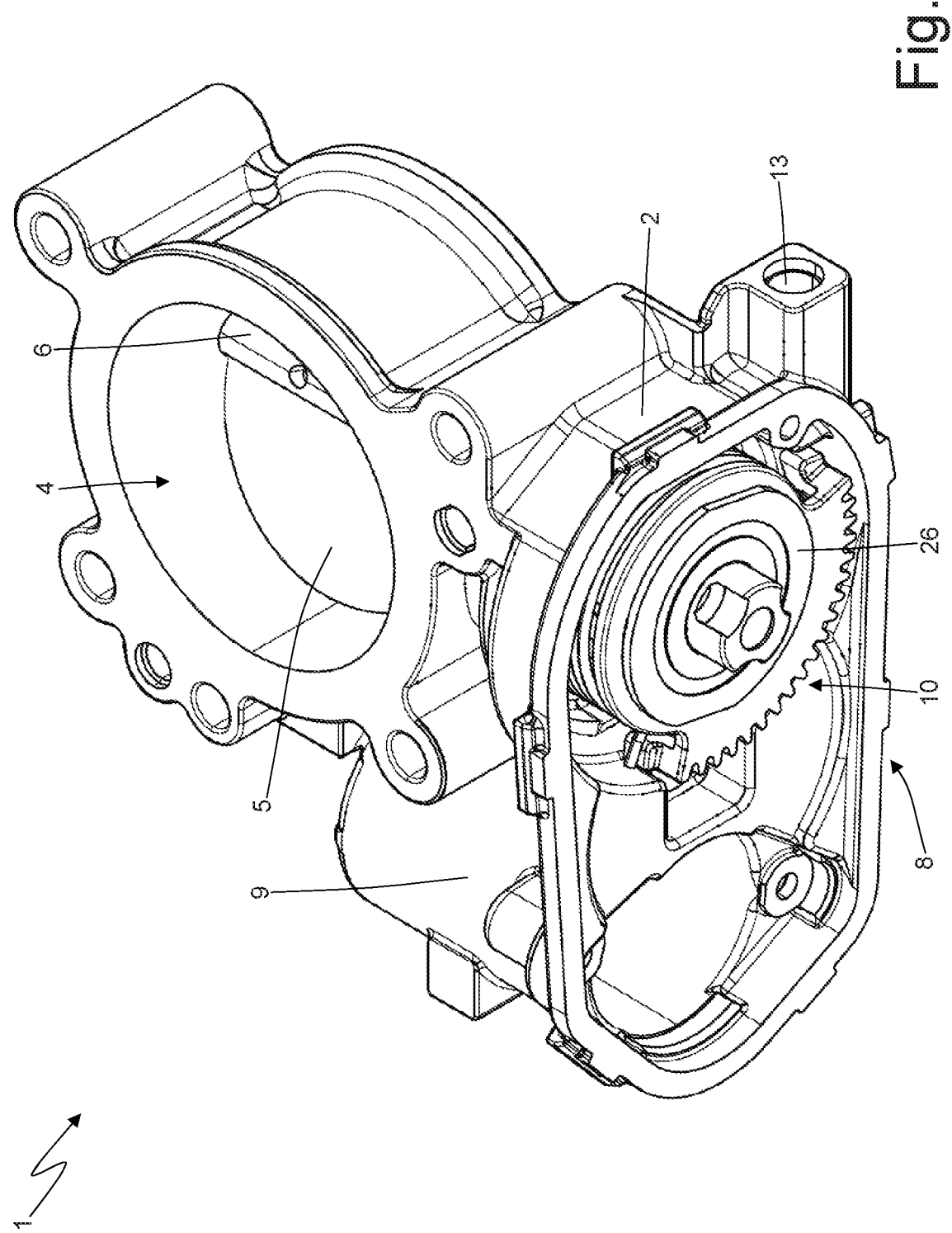
FIG. 1 is a perspective view, with parts removed for clarity, of a throttle valve according to the present invention.

In FIG. 1, an electronically controlled throttle valve for an internal combustion heat engine (not shown) is globally indicated with numeral reference 1.

Figure 2:
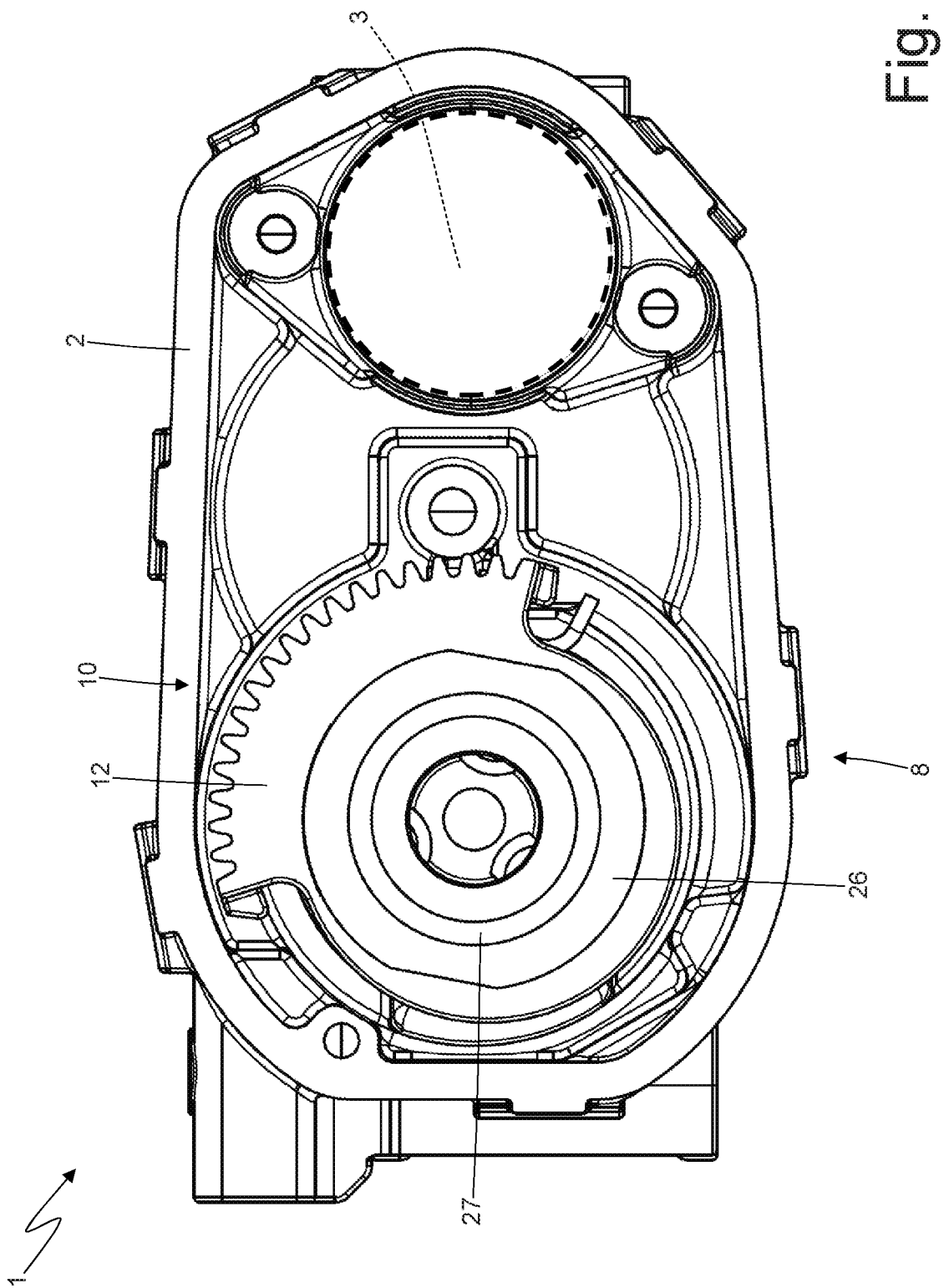
FIG. 2 is a front view, with parts removed for clarity, of the throttle valve in FIG. 1.
Figure 4:
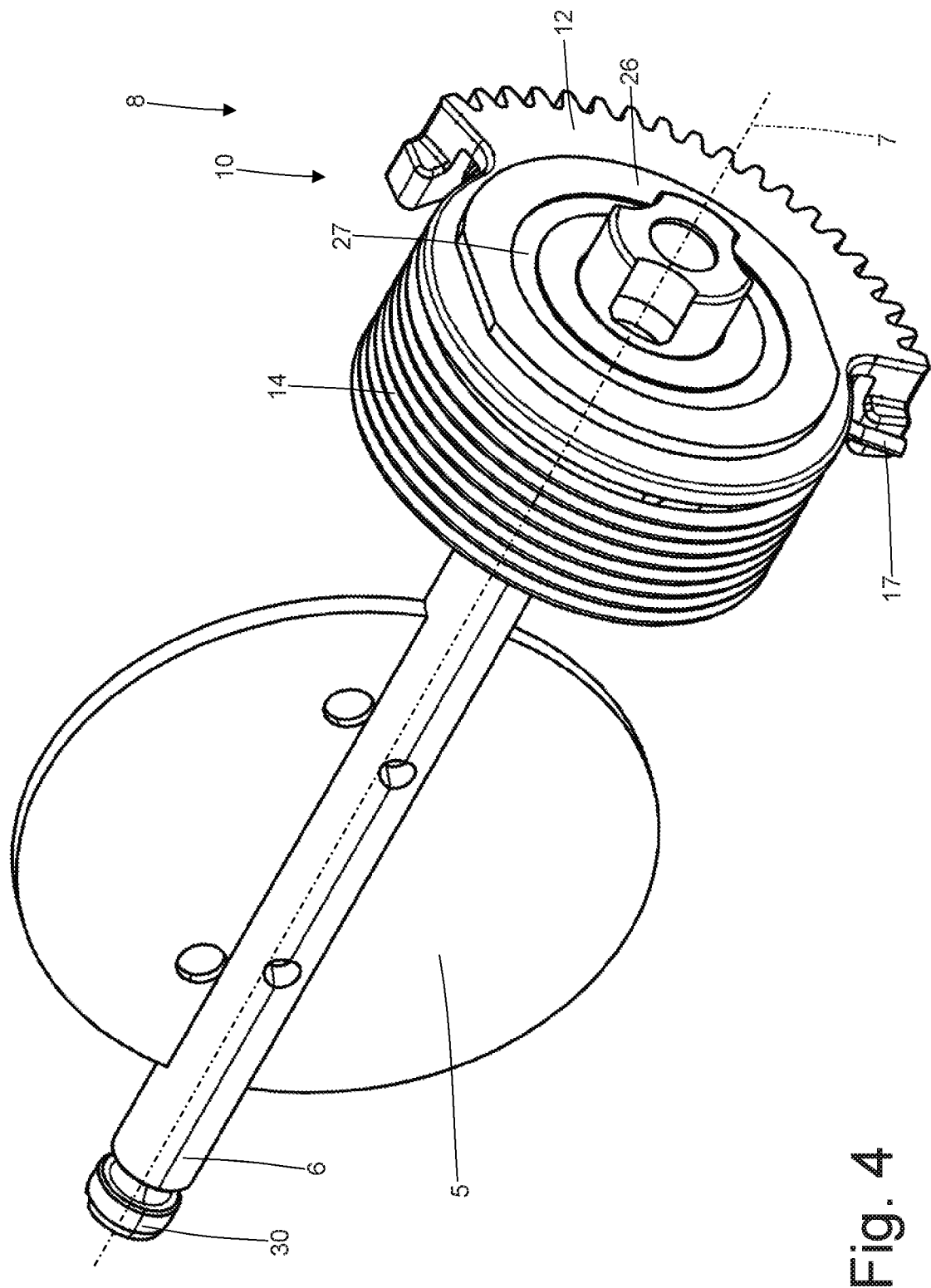
FIG. 4 is a perspective view of a movable apparatus of the throttle valve in FIG. 1.

The throttle valve 1 comprises a metal valve body 2 in which an intake duct 4 is obtained, through which the air sucked in from the internal combustion heat engine passes. The intake duct 4 is engaged by a throttle plate 5, which moves between an opening position and a closing position of the intake duct 4 due to the effect of the action of an electric motor 3 (shown schematically in FIG. 2). In particular, as shown in FIG. 4, the throttle plate 5 is fitted onto a metal shaft 6, which is mounted rotatably about a longitudinal rotation axis 7 to rotate between the opening position and the closing position under the control of the electric motor 3, which is coupled to the shaft 6 by means of a gear transmission 8 (only partially shown in FIG. 4).

As shown in FIG. 1, the electric motor 3 (not shown) is arranged in a tubular housing 9 arranged by the side of the intake duct 4 and it has a shaft, which is mechanically connected to the shaft 6 by means of the gear transmission 8. The gear transmission 8 comprises a cogwheel (not shown), which is angularly integral with the shaft of the electric motor 3, an end gear 10, which is angularly integral with the shaft 6, and an intermediate cogwheel (not shown), which is mounted idle on the valve body 2 and interposed between the cogwheel of the electric motor 3 and the end gear 10. Preferably, the intermediate cogwheel (not shown) has a first series of teeth coupled to the cogwheel of the electric motor 3 and a second series of teeth coupled to the end gear 10; the diameter of the first series of teeth is different from the diameter of the second series of teeth, so the intermediate cogwheel (not shown) determines a non-unitary gear ratio. According to what is better illustrated in FIGS. 10 and 11, the end gear 10 comprises a central cylindrical body 11, which is fitted onto the shaft 6 (i.e. it is angularly integral with the shaft 6) and is provided with a toothed segment 12 provided with a series of teeth coupled to the intermediate cogwheel (not shown).

The intermediate cogwheel (not shown) and the end gear are normally made of a plastic material, while the cogwheel (not shown) of the electric motor 3 is normally made of sintered steel. According to a preferred embodiment, the end gear 10 is made of a plastic material and it is overmoulded around the shaft 6, which is normally made of a metal material (for example, steel or aluminium).

The assembly of the throttle plate 5, the shaft 6 and the end gear 10 make up a movable apparatus, which, in use, rotates about the rotation axis 7 under the control of the electric motor 3.

According to a preferred embodiment, the gear transmission 8 is arranged in a chamber of the valve body 2, which is sealed by a removable cover and made of a plastic material.

According to a preferred embodiment, the throttle valve comprises an inductive position sensor of the "contactless type" (not shown), which is coupled to the shaft 6 and designed to detect the angular position of the shaft 6 and, thus, of the throttle plate 5, to enable a feedback control of the position of the throttle plate 5. For example, the position sensor (not shown) could be of the type described in U.S. Pat. No. 6,236,199B1 and thus comprise a rotor, which is angularly integral with the shaft 6 (in particular with the end gear 10) and a stator supported by the cover and arranged, in use, facing the rotor. Alternatively, the position sensor (not shown) could be of the magnetostrictive type and thus comprise a permanent magnet integral with the shaft 6 (in particular with the end gear 10).

According to a preferred embodiment, a thread-forming minimum screw is comprised, which is screwed into a hole 13 (shown in FIG. 1) obtained through the valve body 2 and cooperating with the toothed segment 12 of the end gear 10; when the shaft 6 is brought by the action of the electric motor 3 into the closing position, the rotation of the shaft 6 is not stopped by the impact between the throttle plate 5 and the walls of the intake duct 4, but it is stopped by the impact of the toothed segment 12 of the end gear 10 against the minimum screw. Such solution is made necessary due to the fact that a potential impact between the throttle plate 5 and the walls of the intake duct 4 could determine an interlocking of the throttle plate 5 with the walls of the intake duct 4 with a consequent jamming of the throttle valve 1.

Figure 5:
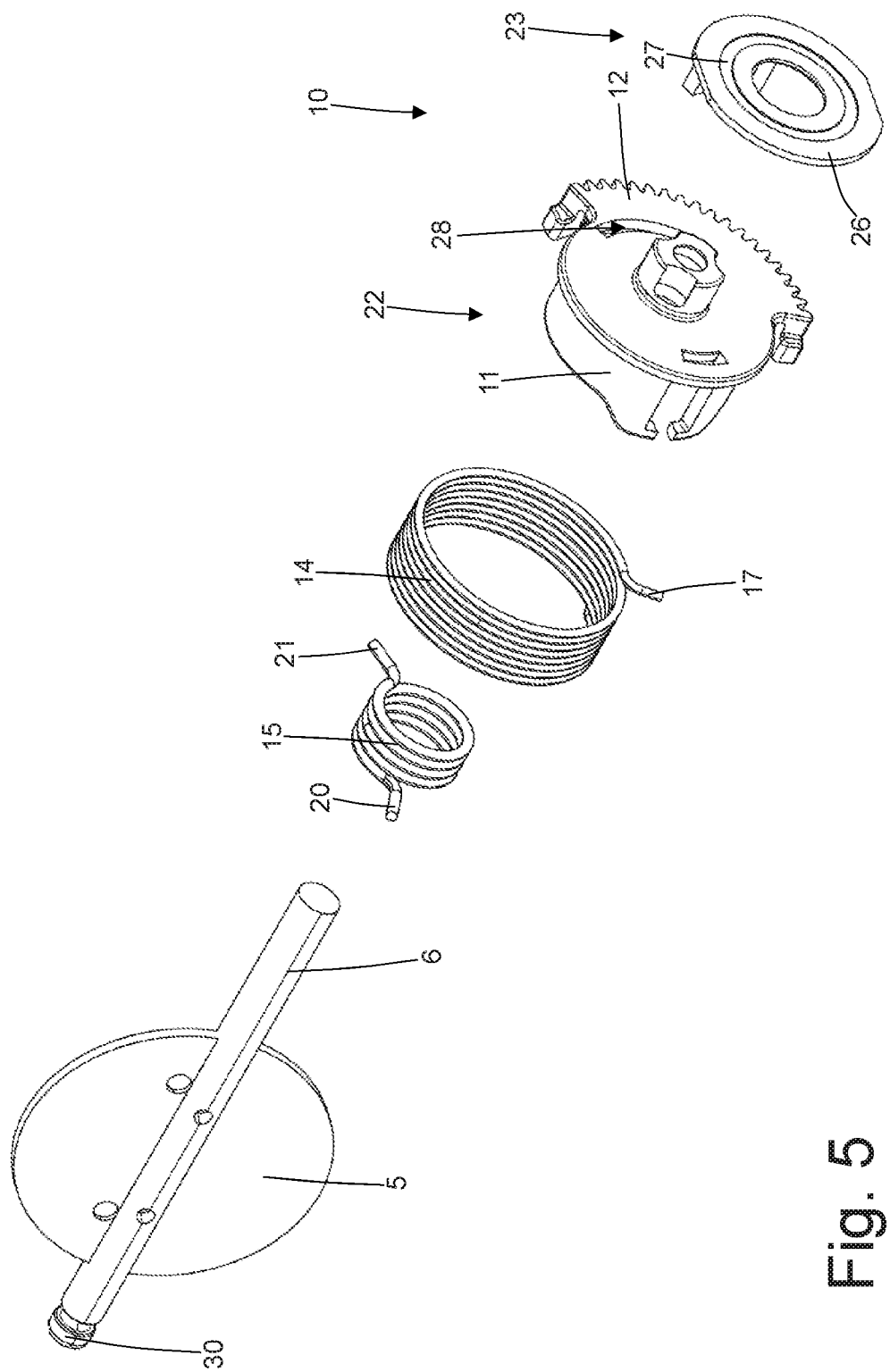

According to what is illustrated in FIGS. 5 and 6, the throttle valve 1 comprises a return spring 14, which is a spiral torsion spring (i.e. the spring deforms according to a circular displacement, generating a resistive torque) and it tends to rotate the shaft 6 in a closing direction with a movement, which brings the throttle plate 5 towards the closing position. The throttle valve 1 further comprises a countering spring 15, which is a spiral torsion spring (i.e. the spring deforms according to a circular displacement, generating a resistive torque) and it tends to rotate the shaft 6 in an opening direction, opposite the closing direction with a movement, which brings the throttle plate 5 towards an opening position. The return spring 14 generates a lower torque than the torque generated by the countering spring 15, therefore, in general, the combination of the effects of the springs 14 and 15 tends to rotate the shaft 6 in the opening direction and towards an opening position of the throttle plate 5.

Figure 3:
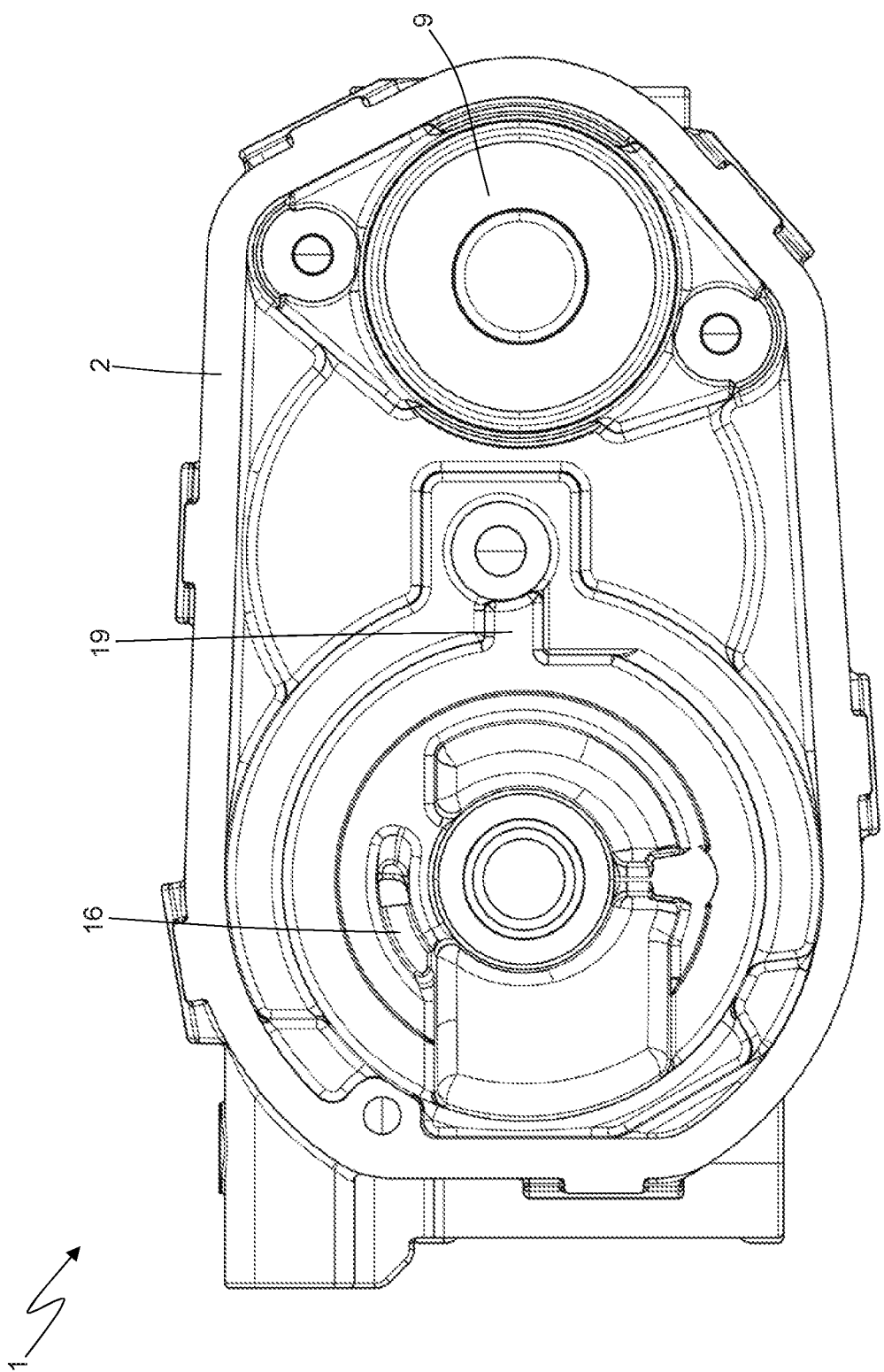
FIG. 3 is a front view of a valve body of the throttle valve in FIG. 1.

As better described below, a striking element 16 is comprised (shown in FIGS. 3 and 8), which is obtained on the valve body 2 (i.e. it is a part of the valve body 2) and it forms a stop for the rotation movement impressed by the countering spring 15 (i.e. the countering spring 15 cannot rotate the shaft 6 beyond the limit position established by the striking element 16), defining an intermediate position of partial opening (between a limit position of complete closing and a limit position of complete opening) or limp-home position. In the absence of interventions by the electric motor 3, the rotation towards the opening position of the shaft 6, due to the effect of the action of the springs 14 and 15, stops in the limp-home position because the torque generated by the countering spring 15 overcomes the torque generated by the closing spring 14 and the rotation of the shaft 6 impressed by the countering spring 15 stops in the limit position established by the striking element 16 (i.e. in the limp-home position). In this way, in the absence of the action of the electric motor 3 the shaft 6 (and thus the throttle plate 5) is arranged in the limp-home position.

The stopping of the rotation of the shaft 6 towards the opening, which occurs during the opening movement from the completely closed position, is due to the fact that the toothed segment 12 integral with the shaft 6 stops against one end 21 of the countering spring 15, which remains still, resting on the striking element 16, when the shaft 6 moves between the limp-home position and the complete closing position.

When the electric motor 3 is activated, the engine torque generated by the electric motor 3 is capable of rotating the shaft 6 (and thus the throttle plate 5) into a position of complete closing against the torque generated by the countering spring 15 and it is capable of rotating the shaft 6 (and thus the throttle plate 5) into a position of maximum opening against the torque generated by the return spring 14.

Figure 7:
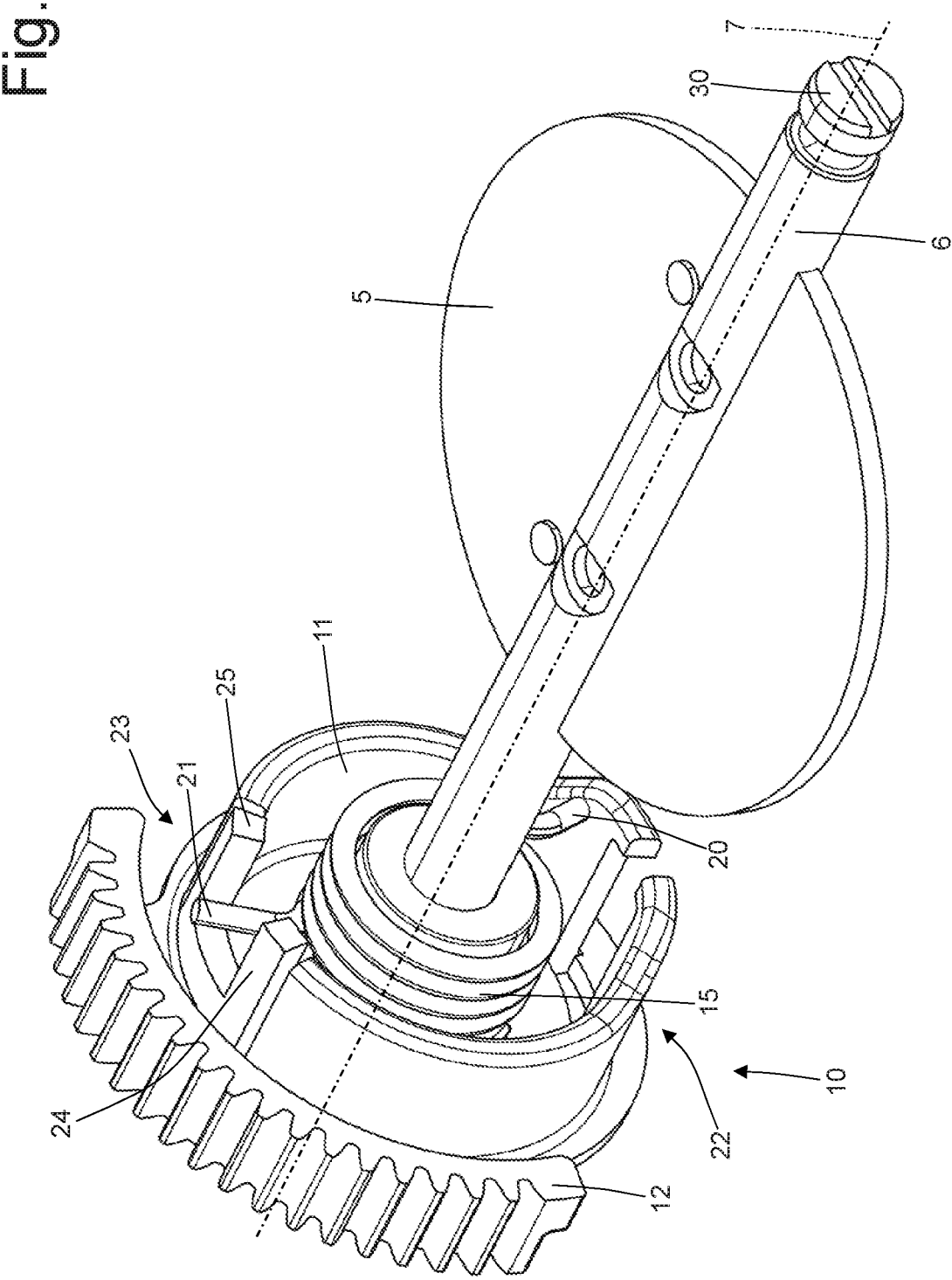
FIG. 7 is a different perspective view of the movable apparatus in FIG. 4 with the return spring also removed.

According to what is illustrated in FIG. 4, the return spring 14 is coaxial to the rotation axis 7 and it is arranged about the cylindrical body 11 of the end gear (i.e. it surrounds the cylindrical body 11 of the end gear 10). According to what is illustrated in FIG. 7, the countering spring 15 is coaxial to the rotation axis 7 and it is arranged inside the cylindrical body 11 of the end gear 10 (and thus it is mounted in the cylindrical body 11 of the end gear 10).

According to what is illustrated in FIGS. 5 and 6, the return spring 14 has one end 17 resting on a wall of the end gear 10 (in particular, on a side wall of the toothed segment 12, as shown in FIG. 4) to push on the end gear 10, and one end 18 opposite the end 17, which is inserted in a seat 19 (shown in FIG. 3) obtained in the valve body 2 to be constrained with the valve body 2 (i.e. to "use force" on the valve body 2 so as to push the end gear 10, and thus the shaft 6 carrying the throttle plate 5, towards the closing position).

As stated previously, the countering spring 15 is mounted on the end gear 10; in particular, one end 20 of the countering spring 15 is integral with the end gear 10 (i.e. it is inserted in a seat of the end gear 10) and the end 21 of the countering spring 15 opposite the end 20 is arranged so that the end gear 10, in the rotating movement thereof, from the position of complete closing to the position of opening, impacts against it, thus stopping in the limp-home position. The end 21 of the countering spring is fixed on the striking element 16 during the movement of the shaft 6 between the complete closing and limp-home positions. Whereas, during the movement of the shaft 6 between the limp-home and complete opening positions, the end 21 of the countering spring is dragged by the end gear 10, thus not having relative movement with respect to the end 20 of the countering spring 15, consequently, not further charging the countering spring 15.

Figure 8:
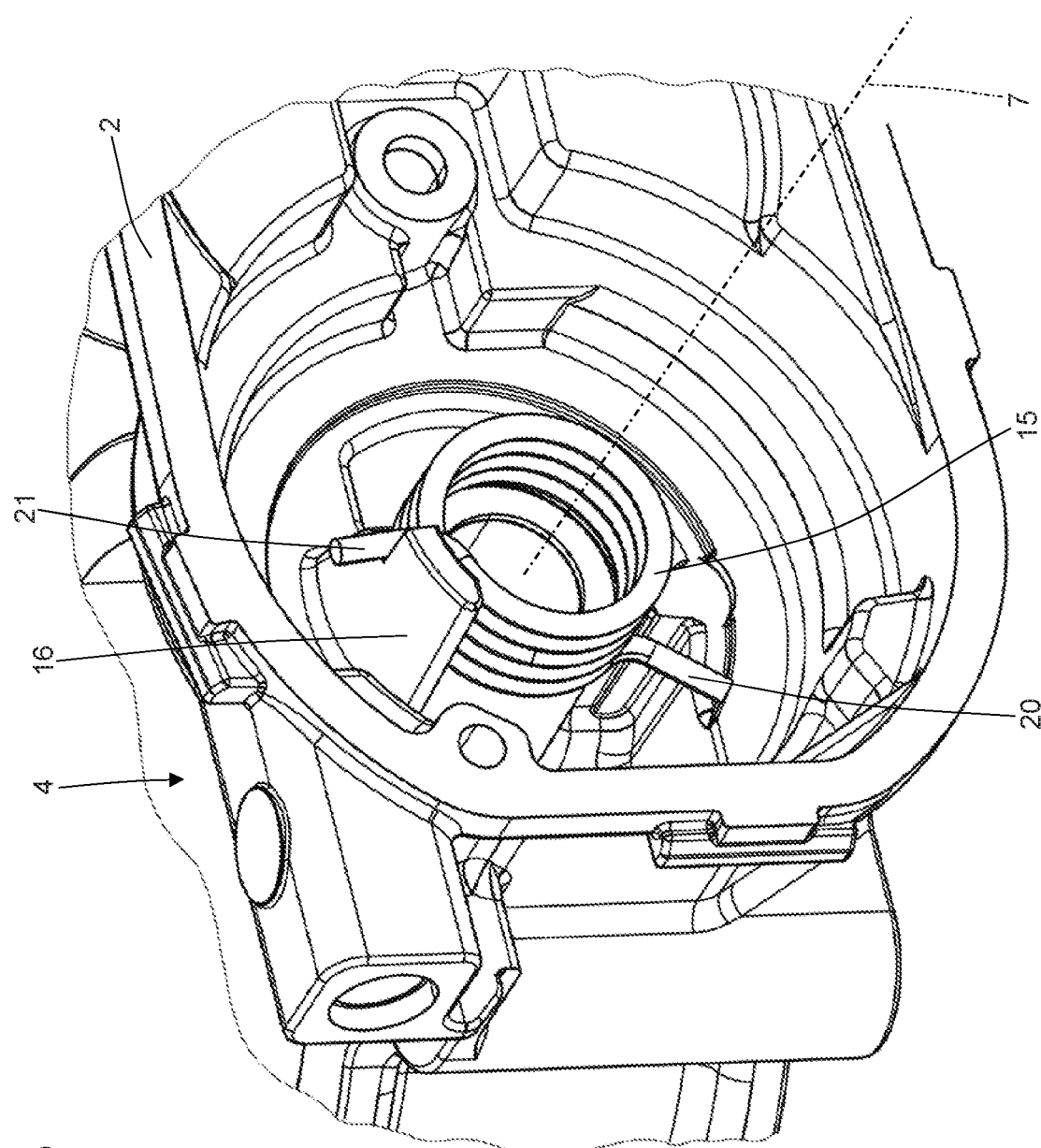
FIG. 8 is a different perspective view, with parts removed for clarity, of the throttle valve in FIG. 1.

In the absence of the action of the electric motor 3 and when the throttle plate 5 is in a position of complete opening, the torque generated by the return spring 14 rotates the shaft 6, and thus the end gear 10, with a movement, which tends to bring the throttle plate 5 towards the closing position. At a certain point, during the rotating movement of the end gear 10 towards the closing position under the thrust of the return spring 14, the end 21 of the countering spring 15 rests on the striking element 16 (as shown in FIG. 8); at this point, a further rotating movement of the end gear 10 towards the closing position determines a deformation of the countering spring and so the countering spring 15 opposes, with the elastic force thereof, a further rotating movement and the end gear 10 (thus the shaft 6 and the throttle plate 5) stop in the limp-home position established by the striking element 16. In other words, on reaching the limp-home position, the end 21 of the countering spring 15 rests on the striking element 16 (as shown in FIG. 8) and thus a further rotation of the end gear 10 towards the position of complete closing deforms the countering spring 15, which reacts by generating a resistive torque, which tends to bring the end gear 10 back to the limp-home position, the torque generated by the countering spring 15 being greater than the torque generated by the return spring 14.

During the movement from the limp-home position to the position of complete closing, the return spring 14 generates a torque, which assists the movement of the shaft 6; thus, while the electric motor 3 actuates this movement, it is assisted by the action of the return spring 14.

Vice versa, during the movement from the position of complete closing to the limp-home position, the return spring 14 generates a torque, which opposes the movement of the shaft 6; thus, during this movement, the electric motor 3 must also overcome the action generated by the return spring 14.

In fact, the return spring 14 always generates a torque aimed at closing the throttle plate 5: in the case of a closing movement, the return spring 14 generates a favourable torque; in the case of an opening movement, the return spring 14 generates an opposite torque.

In summary, in the absence of intervention by the electric motor 3, the shaft 6 (thus the throttle plate 5) is arranged in the limp-home position: in fact, to move from the limp-home position established by the striking element 16 it would be necessary to overcome the elastic force generated by the return spring 14 (to go from the limp-home position towards the position of complete opening) or it would be necessary to overcome the elastic force generated by the countering spring 15 (to go from the limp-home position towards the position of complete closing) and, to overcome the elastic force generated by the springs 14 and 15 the action of the electric motor 3 is needed.

Figure 9:
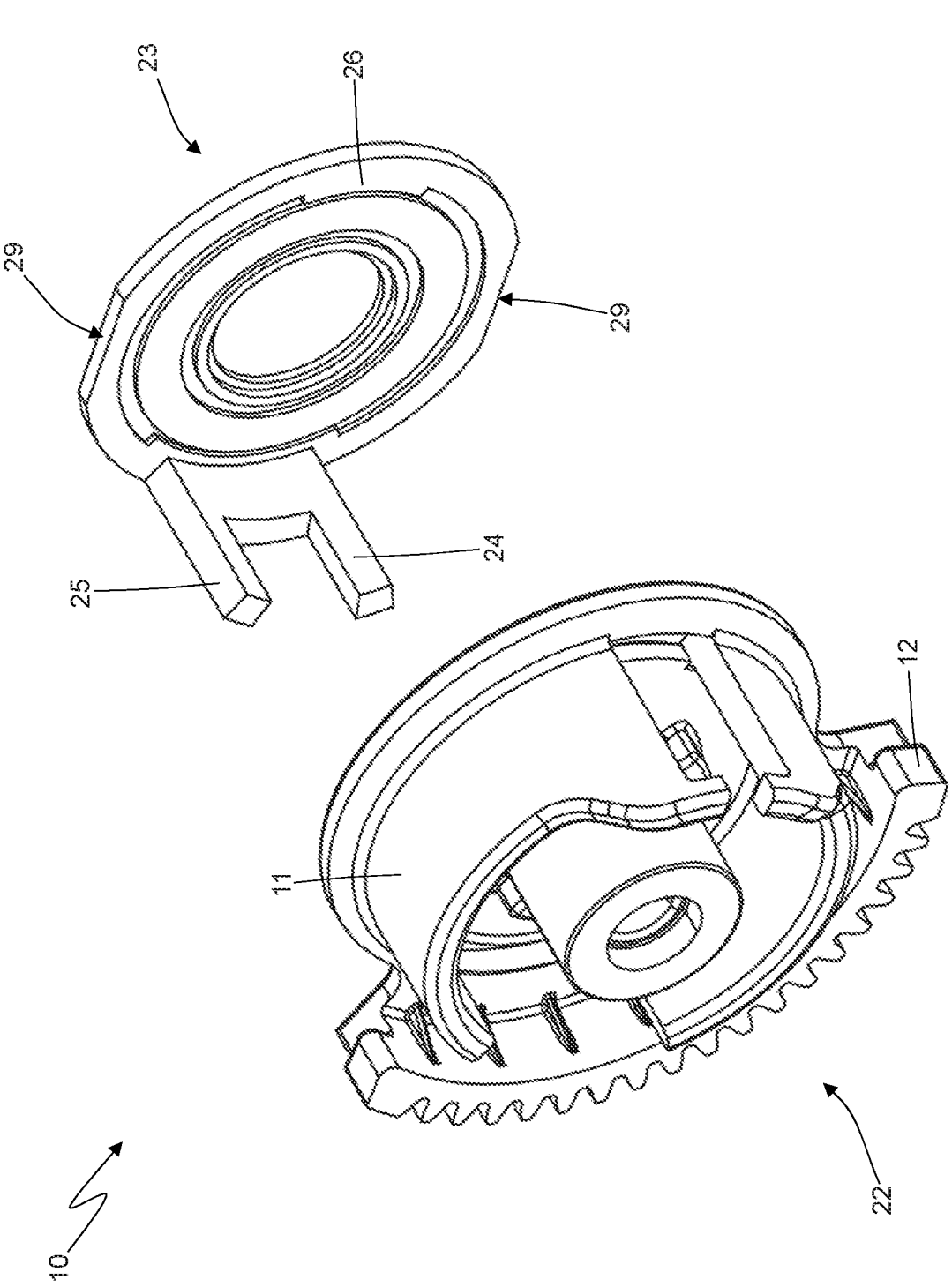
FIGS. 9 and 10 are two different perspective views of two components of an end gear of the movable apparatus in FIG. 4.
Figure 10:
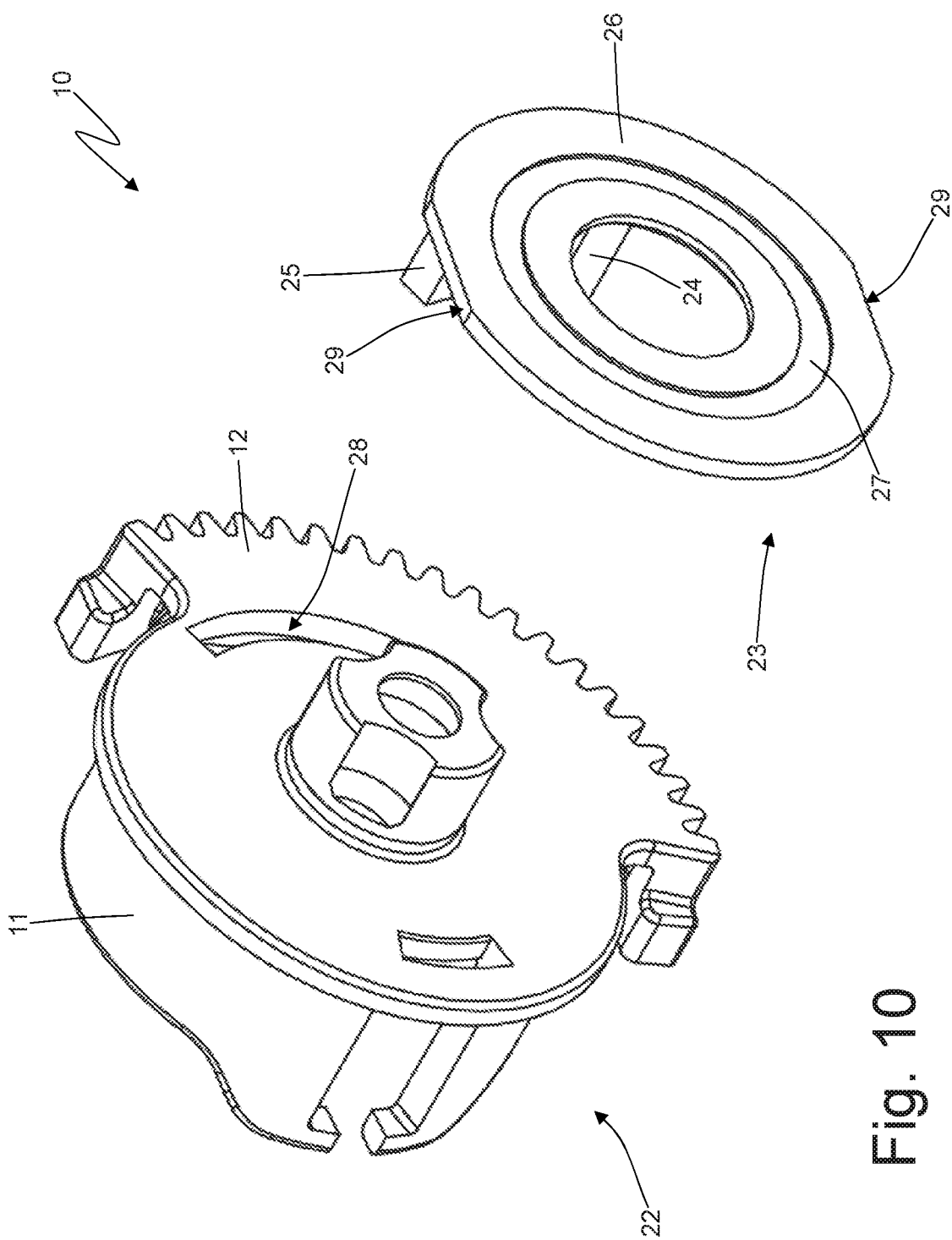

According to what is illustrated in FIGS. 9 and 10, the end gear 10 comprises a main component 22, on which the cylindrical body 11 and the toothed segment 12 are obtained, and an additional component 23, which is coupled and heat-welded (using subsequently described methods) to the main component 22. As illustrated in FIG. 7, the only function of the additional component 23 is to establish the coupling with the end 21 of the countering spring 15: in fact, the additional component 23 comprises two coupling elements 24 and 25, which make up the two tines of a fork (illustrated better in FIG. 9) inside which the end 21 of the countering spring is arranged (as illustrated in FIG. 7). In particular, the coupling element 25 is arranged at the striking element 16 and the end 21 of the countering spring 15 is resting on the coupling element 25 in the limp-home position.

According to what is illustrated in FIGS. 9 and 10, the additional component 23 has a central body 26 with the shape of a disc, from which the two coupling elements 24 and 25 project, facing axially (i.e. parallel to the rotation axis 7). At an outer surface (i.e. opposite the main component 22), the central body 26 of the additional component 23 has an annular groove 27, which, as described better below, identifies the connection area by means of heat-welding between the additional component 23 and the main component 22; in other words, the additional component 23 is constrained to the main component 22 by means of an annular heat-welding, which develops at the annular groove 27.

According to a preferred embodiment, the additional component 23 is made of a first plastic material, which is transparent to laser beams, i.e. with a plastic material, which is crossed by laser beams without absorbing the laser beams (thus without heating due to the effect of the laser beams; whereas, the main component 22 is made of a second plastic material, which is at least partially different from the first plastic material and absorbs laser beams (thus heating due to the effect of the laser beams). According to a preferred embodiment, the first plastic material, which makes up the additional component 23 has the same base as the second plastic material, which makes up the main component 22 (to allow a good mutual welding thereof) with the addition of additives, making it transparent to laser beams.

According to what is illustrated in FIG. 10, the main component 22 comprises a through opening 28 inside which the two coupling elements 24 and 25 of the additional component 23 are arranged when the additional component 23 is coupled to the main component 22. The angular extension of the through opening 28 of the main component 22 is greater than the angular extension of the coupling elements 24 and 25 to enable a certain degree of relative rotation of the additional component 23 with respect to the main component 22; in other words, after being coupled to each other and before being connected by means of heat-welding, the two components 22 and 23 can be rotated with respect to each other to vary the relative angular position thereof (for example, the maximum rotation between the two components 22 and 23 could be 5-15°). It is important to point out that, as illustrated in FIG. 7, the whole main component 22 is shaped to enable the additional component 23 to rotate with respect to the main component 22 (clearly before carrying out the heat-welding): in fact, it is clear that there is a free space between the two coupling elements 24 and 25 of the additional component 23 and the cylindrical body 11 of the main component 22 to enable the two coupling elements 24 and 25 of the additional component 23 to rotate with respect to the cylindrical body 11 of the main component 22.

According to a preferred embodiment better illustrated in FIGS. 9 and 10, the central body 26 of the additional component 23 has two flattened portions 29, which give the central body 26 an asymmetrical shape, which can be firmly engaged (through a shape coupling) by a tool (described below) so as to make the tool angularly integral with the central body 26.

According to a preferred embodiment, better illustrated in FIG. 7, at one end of the shaft 6 opposite the chamber of the valve body 2 (i.e. opposite the end gear 10) there is a screwdriver input 30 made in one piece with the shaft 6, which can be engaged by a tool to rotate the shaft 6. In particular, the screwdriver input 30 can be accessed from the outside also when the shaft 6 is mounted in the valve body 2 due to a special opening obtained in the valve body 2.

During the assembly of the throttle valve, after assembling the return spring 14 on the valve body 2, the countering spring 15 and the additional component 23 of the end gear 10 are mounted on the shaft 6 provided with the main component 22 of the end gear 10 (which is overmoulded on the shaft 6); it is important to point out that in this step the additional component 23 is not (yet) heat-welded to the main component 22 thus leaving the additional component 23 free to rotate with respect to the main component 22. At this point, the shaft 6 (bearing the two components 22 and 23 of the end gear 10 and the countering spring 15) is inserted in the valve body 2, where it rests on two special supports, which make up two rolling guides. During the assembly of the shaft 6, it is necessary to apply a rotation to the shaft 6 so that the toothed segment 12 engages with the end 17 of the return spring 14 bringing it into the preloaded position. Once the shaft 6 is in position, the throttle plate 5 is inserted into the special slit obtained in the metal part of the shaft 6 (which is inside the intake duct 4); at this point, the throttle plate 5 is constrained to the shaft 6 by means of screws.

On completion of assembly and mounting the internal movable apparatus, it is necessary to proceed with calibrating the limp-home position, which terminates with the "freezing" of the angular position of the two components 22 and 23 of the end gear 10 by means of heat-welding.

A station 31 for calibrating the limp-home position of the throttle valve 1 is shown in FIG. 11.

The calibration station 31 comprises a duct 32, which is pneumatically connected to the intake duct 4 of the throttle valve 1, it is designed to apply a depression (suction) similar to the depression (suction) of a suction duct of an internal combustion heat engine, and it is provided with a flow meter 33 (for example, a mass flow sensor); during calibration of the limp-home position, the duct 32 is designed to circulate an air flow (similar to the flow of air in a suction duct of an internal combustion heat-engine), through the intake duct 4, whose flow rate is measured by the flow meter 33.

The calibration station 31 comprises an actuator 34, which is designed to rotate the shaft 6 of the throttle valve by acting on the screwdriver input 30 and it is controlled by the flow meter 33; in particular, the actuator 34 comprises a screwdriver, which engages the screwdriver input 30 and an electric motor (generally provided with a reducer), which is designed to rotate the screwdriver itself with great precision.

The calibration station 31 comprises a tool 35, which is designed to engage the central body 26 of the additional component 23 of the end gear 10 by means of a shape coupling (in particular, at the two flattened portions 29), both to prevent the rotation of the additional component 23 and to press (push) the additional component 23 axially against the main component 22. In other words, the tool 35 has a double function: it must engage the central body 26 of the additional component 23 with a shape coupling (at the two flattened portions 29) to prevent the rotation of the additional component 23 and, at the same time, it must apply an axial pressure on the additional component 23 to keep the additional component 23 pressed forcefully against the main component 22. According to a preferred embodiment, the tool 35 is made of a plastic material, which is transparent to laser beams, i.e. with a plastic material, which is crossed by laser beams without absorbing the laser beams.

Finally, the calibration station 31 comprises an emitter 36, which is designed to emit a laser beam 37, which is directed towards the central body 26 of the additional component 23 of the end gear 10 (in particular, at the annular groove 27 of the central body 26). The laser beam 37 crosses the tool 35 substantially integral (which is transparent to the laser beam 37), thus the laser beam 37 crosses the central body 26 of the additional component 23 substantially integral (which is transparent to the laser beam 37), and finally the laser beam 37 reaches the main component 22, which absorbs the laser beam 37, heating up and causing the localised fusion of the plastic material. The combined effect of the heat generated by the laser beam 37, which affects the main component 22, and the axial pressure exerted by the tool 35 determines the heat-welding of the main component 22 to the central body 26 of the additional component 23.

The calibration station 31 described above is completely automated; it is clear that some functions of the calibration station 31 could be performed manually by an operator instead of by an automatic device.

In use, the throttle valve 1 is coupled to the duct 32, to the actuator 34 and to the tool 35, while the additional component 23 of the end gear 10 is left free to rotate with respect to the main component 22 of the end gear 10 (i.e. the main component 22 of the end gear 10 is left free to rotate with respect to the additional component 23 of the end gear 10). In this situation, the throttle plate 5 is in the limp-home position (the electric motor 3 hasn't been mounted yet or, if already mounted, it is kept switched off, and so the throttle plate 5 is moved solely by the action of the springs 14 and 15). Air is made to circulate at a pressure similar to the pressure in the suction duct of an internal combustion heat engine, along the duct 32 (and so through the throttle valve 1). Thus, the actuator 34 acts on the screwdriver input 30 of the shaft 6 (i.e. it rotates the shaft 6 acting on the screwdriver input 30) under the control of the flow meter 33 to vary the air flow rate flowing through the throttle valve 1 in the limp-home position, pursuing (searching for) the nominal (desired) air flow rate.

When the actuator 34 rotates the shaft 6 acting on the screwdriver input 30), the rotation of the shaft 6 is transmitted to the main component 22 of the end gear 10 (which is rigidly constrained to the shaft 6) but not to the additional component 23, which is (still) angularly decoupled from the additional component 23 and held still by the tool 35; consequently, the rotation of the shaft 6 imposed by the actuator 34 determines a corresponding rotation of the main component 22 of the end gear 10 with respect to the additional component 23, which, in turn, determines a displacement of the position of the coupling elements 24 and 25 (integral with the additional component 23) with respect to the main component 22 of the end gear 10.

In other words, after assembly, the action of the countering spring 15 brings into mutual contact the end 21 of the countering spring 15, the element 25 of the additional component 23, and the cylindrical body 11 of the main component 22 (i.e. all three of these bodies are in mutual contact). At this point, the additional component 23 is locked by the tool 35 and the main component 22 (integral with the throttle plate 5) is rotated by the actuator 34 by the angle needed to reach the nominal (desired) limp-home flow rate.

When the nominal (desired) limp-home flow rate is reached, i.e. when the flow meter 33 detects that the nominal (desired) limp-home flow rate flows through the throttle valve 1 arranged in the limp-home position, it is possible to "freeze" the angular position of the additional component 23 with respect to the main component 22, performing the laser heat-welding of the central body 26 of the additional component 23 to the main component 22, through the combined action of the emitter 36 and the tool 35, according to the methods described previously.

Then, the throttle valve 1 is removed from the calibration station 31 and the assembly of the other components of the throttle valve 1 is completed (for example, the intermediate cogwheel, the electric motor 3 if it wasn't already assembled beforehand, and the cover); it is important to note that the components, which are mounted afterwards in the throttle valve 1 (for example, the intermediate cogwheel) could hinder the coupling of the tool 35 to the central body 26 of the additional component and thus couldn't be mounted before calibrating the limp-home position.

In the embodiment shown in the appended Figures, the throttle valve 1 described above is designed to be inserted along a suction duct of an internal combustion heat engine, to regulate the flow rate of air sucked in. According to an alternative embodiment, the throttle valve 1 described above is designed to be inserted along a discharge duct of an internal combustion heat engine to regulate the flow rate of discharge gas. According to a further embodiment, the throttle valve 1 described above is designed to be inserted along a duct of a hydrogen propulsion system using fuel cells, for example, to regulate the flow rate of the air/hydrogen mixture. Generally, the throttle valve 1 described above can be used along any duct of a vehicle propulsion system to regulate the fluid flow rate flowing along the duct (clearly when it is necessary that, in the absence of external interventions, the throttle valve 1 is arranged spontaneously in an intermediate position of partial opening corresponding, in the case of suction, to the limp-home position).

The throttle valve 1 described above offers several advantages.

Firstly, in the throttle valve 1 described above, the air flow rate which flows in the limp-home position can be established in a highly precise manner regardless of the structural tolerances since the errors introduced by the structural tolerances are compensated during the step of final calibration, varying the position of the additional component 23 (which bears the two coupling elements 24 and 25, which interact with the end 21 of the countering spring 15) with respect to the main component 22. In general, the tolerance on the air flow rate flowing in the limp-home position can be less than ±4-5%.

Furthermore, the throttle valve 1 described above is simple and cheap to make because, with respect to a similar known throttle valve it comprises, as the only addition, the additional component 23, which is, in the throttle valve 1 as a whole, a "small piece of moulded plastic". Finally, the calibration of the limp-home flow rate in the throttle valve 1 described above is particularly simple and, above all, can be automated and can thus be carried out in a quick and certifiable manner.

LIST OF REFERENCE NUMBERS IN THE FIGURES 1 throttle valve
2 valve body
3 electric motor
4 intake duct
5 throttle plate
6 shaft
7 rotation axis
8 gear transmission
9 tubular housing
10 end gear
11 cylindrical body
12 toothed segment
13 hole
14 return spring
15 countering spring
16 striking element
17 end
18 end
19 seat
20 end
21 end
22 main component
23 additional component
24 coupling element
25 coupling element
26 central body
27 annular groove
28 through opening
29 flattened portions
30 screwdriver input
31 calibration station
32 duct
33 flow rate meter
34 actuator
35 tool
36 emitter
37 laser beam

The invention claimed is:

1. A throttle valve (1) comprising:
a valve body (2);
an intake duct (4), which is obtained in the valve body (2);
a throttle plate (5), which is arranged in the intake duct (4);
a shaft (6), which is mounted so as to rotate in the valve body (2) and supports the throttle plate (5);
an electric motor (3);
a gear transmission (8), which couples the electric motor (3) to the shaft (6) and comprises an end gear (10), which is integral with the shaft (6);
a return spring (14), which is designed to rotate the throttle plate (5) towards a closing position;
a striking element (16), which is obtained in the valve body (2) and establishes an intermediate position of partial opening; and
a countering spring (15), which is fitted on the end gear (10), is designed to rotate the throttle plate (5) towards an opening position and up to the intermediate position, and has a first end (21), which is designed to rest against the striking element (16) during the rotation of the end gear (10);

wherein the end gear (10) comprises at least one coupling element (24, 25), which is designed to rest against the first end (21) of the countering spring (15);

wherein the end gear (10) comprises a plastic main component (22), which supports the countering spring (15) and a plastic additional component (23), which is coupled to the main component (22) and supports the coupling element (24, 25);

wherein the additional component (23) is heat-welded to the main component (22) so as to prevent the rotation between the two components (22, 23); and wherein the main component (22) is shaped so as to enable a rotation between the two components (22, 23) before the two components (22, 23) are heat-welded.

2. The throttle valve (1) according to claim 1, wherein the additional component (23) comprises two coupling elements (24, 25), which make up the two tines of a fork, inside which the first end (21) of the countering spring (15) is arranged.

3. The throttle valve (1) according to claim 1, wherein the additional component (23) has a disc-shaped central body (26), from which the coupling element (24, 25) projects.

4. The throttle valve (1) according to claim 1, wherein the additional component (23) has an annular groove (27) at which the heat-welded joint between the additional component (23) and the main component (22) is arranged.

5. The throttle valve (1) according to claim 1, wherein:
the additional component (23) is made of a first plastic material, which is transparent to laser beams; and
the main component (22) is made of a second plastic material, which is at least partially different from the first plastic material and absorbs laser beams.

6. The throttle valve (1) according to claim 5, wherein the first plastic material making up the additional component (23) has the same base as the second plastic material making up the main component (22) with the addition of additives, making it transparent to laser beams.

7. The throttle valve (1) according to claim 1, wherein the main component (22) comprises a through opening (28) inside which the coupling element (24, 25) of the additional component (23) is arranged.

8. The throttle valve (1) according to claim 1, wherein the through opening (28) of the main component (22) has a greater angular extension than an angular extension of the coupling element (24, 25) of the additional component (23) so as to enable a relative rotation of the additional component (23) with respect to the main component (22).

9. The throttle valve according to claim 1, wherein a central body (26) of the additional component (23) has two flattened portions (29), which give the central body (26) an asymmetrical shape, which can be firmly engaged by a tool (35) so as to make the tool (35) angularly integral with the central body (26).

10. The throttle valve (1) according to claim 1, wherein at one end of the shaft (6) opposite the end gear (10) there is a screwdriver input (30), which can be engaged by a tool to rotate the shaft (6).

11. The throttle valve (1) according to claim 1, wherein the main component (22) of the end gear (10) is over-moulded around the shaft (6).

12. The throttle valve (1) according to claim 1, wherein a second end (20) of the countering spring (15) opposite the first end (21) is integral with the end gear (10).

* * * * *